Nov. 14, 1950     L. C. WEATHERS     2,529,525
ALTERNATING CURRENT COMMUTATOR MACHINE
Filed July 28, 1948     2 Sheets—Sheet 1
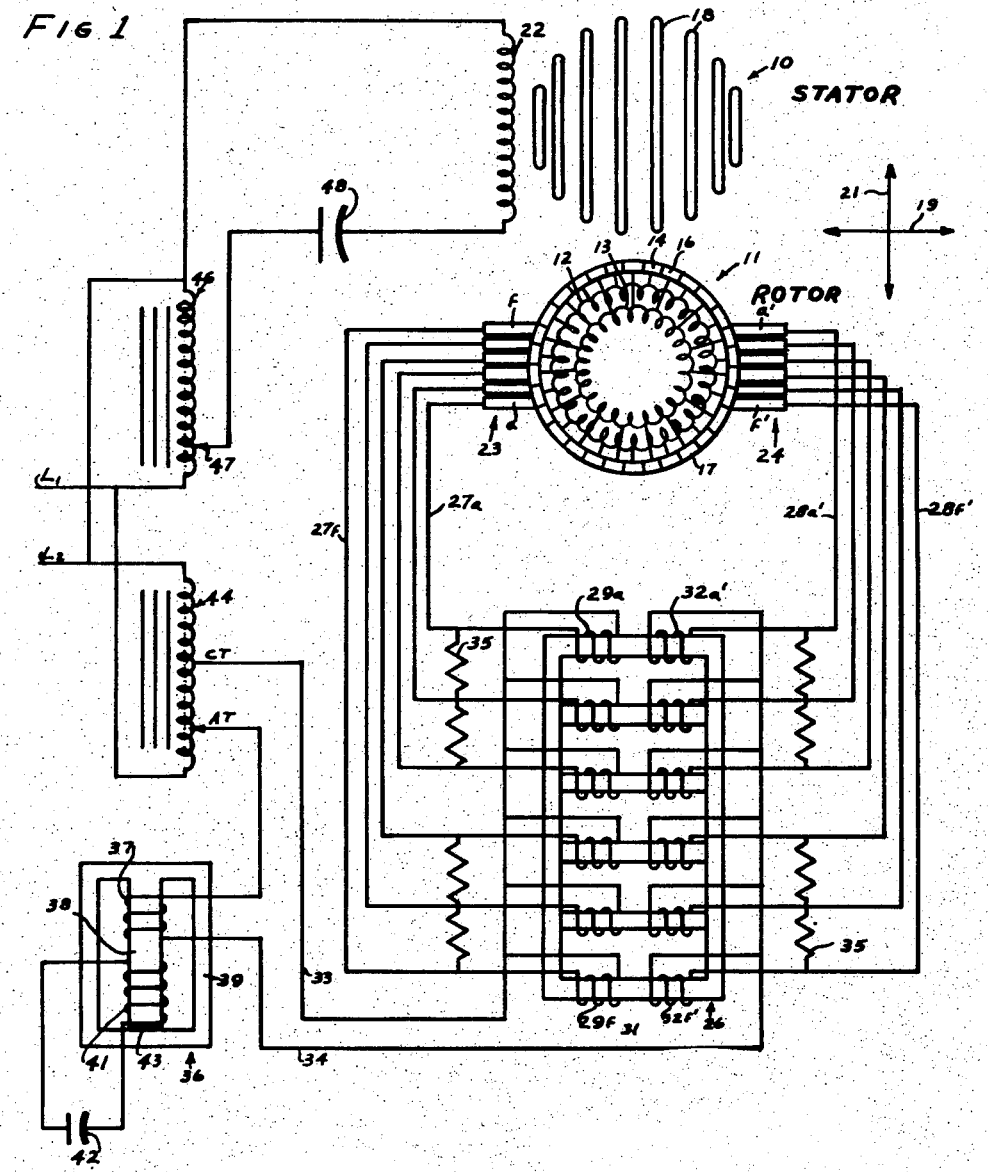
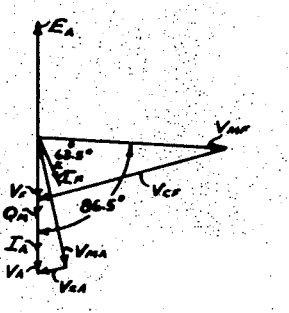
INVENTOR.
LELAND CLAY WEATHERS
BY Bacon & Thomas
Attys.

Nov. 14, 1950   L. C. WEATHERS   2,529,525
ALTERNATING CURRENT COMMUTATOR MACHINE
Filed July 28, 1948   2 Sheets-Sheet 2

INVENTOR.
LELAND CLAY WEATHERS
BY Bacon & Thomas
attys.

Patented Nov. 14, 1950

2,529,525

UNITED STATES PATENT OFFICE 2,529,525

ALTERNATING CURRENT COMMUTATOR MACHINE

Leland Clay Weathers, Plymouth, Mich., assignor to Vickers Incorporated, Detroit, Mich., a corporation of Michigan Application July 28, 1948, Serial No. 41,113

6 Claims. (Cl. 318—244)

This invention relates to power transmission, and more particularly, to an alternating current shunt motor system in which the armature current is maintained in phase with the mutual flux by a circuit which involves neutralizing of the inductive reactance of the armature circuit with inserted capacitive reactance in order to produce a condition of series resonance in the armature circuit.

In addition to commutation difficulties in alternating current shunt motor circuits, the chief difficulty with such motors is that it has not heretofore been possible to maintain the armature current in phase with the mutual flux. If the motor is to have high efficiency and good speed regulation, the armature current must remain in phase with the mutual flux since it is only the component of the armature current which is in phase with the mutual flux which produces torque, any out of phase component causing heating of the motor and lessening of efficiency. Also, the presence of a component armature current which is out of phase with the mutual flux causes an unnecessary resistance drop having an adverse effect upon the speed regulation of the motor. Furthermore, any unneutralized inductive reactance in the armature circuit produces a reactance drop further adversely affecting the speed regulation.

In accordance with the present invention, the entire armature circuit of the motor is brought into series resonance by inserting series capacitive reactance into the armature circuit in just the right amount to balance the inductive reactance thereof. This substantially eliminates reactance drops in the armature circuit and brings the armature current into phase with the armature circuit applied voltage. This phase relation does not vary under load as is the case when any resultant reactance drop is present in the armature circuit. In order to maintain the armature current in phase with the mutual flux, however, the mutual flux must also be maintained in phase with the armature circuit applied voltage. In order to maintain the mutual flux in phase with the armature circuit applied voltage reaction upon the excitation circuit from currents in the armature coils must be substantially prevented. Any reaction from such currents will vary the impedance of the excitation circuit and since the field circuit applied voltage ordinarily has a fixed phase relationship with respect to the armature circuit applied voltage, such reaction will shift the phase of the excitation current and mutual flux with respect to the field circuit applied votlage, and therefore with respect to the armature circuit applied voltage and armature current. The present application, therefore, also discloses circuits for substantially preventing such reaction including means for confining substantially all of the mutual flux to the excitation axis so that substantially no mutual flux is present in the power axis, and means for substantially preventing the flow of armature coil short circuit currents due to transformer voltages induced in the coils undergoing commutation by the alternating mutual flux.

It is therefore an object of the present invention to provide an improved alternating current shunt motor in which reactance drops in the armature circuit are substantially eliminated.

Another object of the invention is to provide an alternating current shunt motor in which the armature circuit is maintained in a condition of series resonance so that the armature current can be kept in phase with the mutual flux.

Another object of the invention is to provide an alternating current shunt motor in which the armature circuit is resonated to maintain the armature current in phase with the armature circuit applied voltage and in which the reaction of currents in the armature upon the field circuit is substantially prevented so that the mutual flux can be maintained in fixed phase relationship with the armature circuit applied voltage and therefore in phase with the armature current.

A further object of the invention is to provide an improved alternating current shunt motor in which a combined reactor and resonator transformer is employed both to maintain the armature circuit in series resonance so as to enable the armature current to be maintained in phase with the mutual flux and to substantially prevent the flow of short circuit currents in the armature coils undergoing commutation.

Other objects and advantages of the invention will appear from the following description of preferred embodiments thereof shown in the attached drawing, in which:

Fig. 1 is a schematic diagram of a motor system in accordance with the present invention;

Fig. 2 is a simplified vector diagram applicable to the circuit of Fig. 1;

Figure 3:
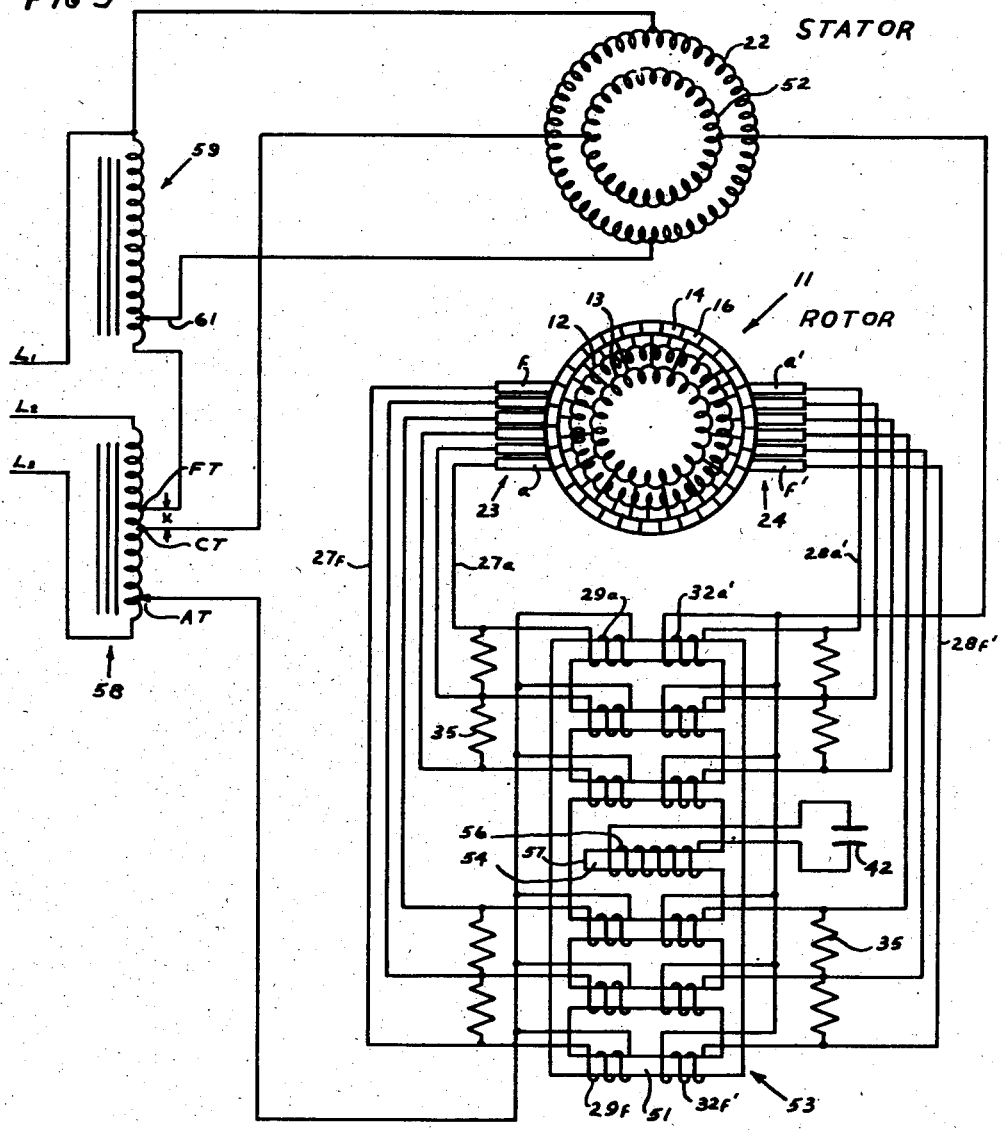
Fig. 3 is a view similar to Fig. 1 showing a modified circuit.

Referring more particularly to the drawing, the circuit of Fig. 1 illustrates a motor having a stator 10 and a rotor 11, the rotor being in the form of an armature provided with dual electrically independent closed windings 12 and 13 connected to alternate commutator bars 14 and 16, respectively of a commutator 17. The stator of the motor is provided with a short circuited low impedance winding made up of a plurality of closed loops indicated at 18 and positioned to provide a low impedance in the power axes of the motor indicated by the double arrow 19, and a high impedance in the excitation axis indicated by the double arrow 21. That is to say, the stator winding made up of the loops 18 is short circuited in the power axes of the motor. The stator also includes an excitation winding 22 which may be energized to produce a flux in the excitation axis 21 of the machine, the short circuited stator winding referred to confining substantially all of the mutual flux to the excitation axis.

The dual armature windings 12 and 13, connected to alternate commutator bars 14 and 16 of the commutator 17, are employed in conjunction with a pair of brush structures 23 and 24 for each pair of poles, the brush structures being spaced 180 electrical degrees apart, and in conjunction with a reactor structure 26 to prevent flow of armature coil short circuit currents which would not only interfere with commutation but which would react upon the excitation circuit to shift the desired phase relationship between the mutual flux and the excitation circuit applied voltage. The brush structure 23 is made up of a plurality of individual brush elements, preferably at least six brush elements, $a$ to $f$, inclusive, insulated from each other, and similarly, the brush structure 24 is made up of a plurality of brush elements $a'$ to $f'$, inclusive, these brush elements also being insulated from each other. The brush elements $a$ to $f$, inclusive, of the brush structure 23 are connected to one of the ends of individual external conductors 27a to 27f, respectively, and similarly, the brush elements $a'$ to $f'$, inclusive, of the brush structure 24 are each connected to one of the ends of individual external conductors 28a' to 28f', respectively. The other ends of the conductors 27a to 27f, inclusive, are connected to reactor coils 29a to 29f, respectively, each of such coils being positioned upon a separate leg of a six-legged transformer core 31. Similarly, the other ends of the conductors 28a' to 28f' are individually connected to one end of reactor coils 32a' to 32f', respectively, these reactor coils also each being positioned upon a leg of the reactor core 31. The other ends of the reactor coils 29a to 29f are all connected to a common conductor 33 and the other ends of the reactor coils 32a' to 32f' are all connected to a common conductor 34.

The circumferential width and spacing of the brush elements $a$ to $f$ and $a'$ to $f'$ is carefully correlated with the width and spacing between the bars 14 and 16 of the commutator 17, to cause any armature coil short circuit currents to flow through the reactor coils on the core 31 in accordance with the disclosure of my copending application Serial No. 696,006, filed September 10, 1946, now Patent No. 2,505,018, granted April 25, 1950.

In the reactor structures shown, it will be found that magnetomotive forces due to armature coil short circuit currents flowing through the reactor coils add to produce a resulting flux in the core 31 so that a high impedance is presented to such short circuit currents, but that the magnetomotive forces due to armature power currents flowing through the reactor coils oppose each other so that a low impedance is presented to armature power current. The reactor structure illustrated tends to keep the instantaneous currents through the various brush elements equal at all times, while for proper operation of the motor the instantaneous currents through the two armature windings should be substantially equal and the same is true of the currents in the two halves of each armature winding. The latter requires that the instantaneous currents through the various brush elements vary with respect to each other. Such variation of current without substantial increase in armature coil short circuit current can be obtained by connecting shunt resistors 35 between certain of the brush elements. These shunt resistors thus enable the armature power currents to be balanced in the armature windings.

The reactor circuit illustrated does insert a small amount of inductive reactance into the armature circuit, but this as well as the inductive reactance of the armature is balanced by inserting series capacitive reactance in the armature circuit. Since there is substantially no magnetic coupling in the power axis between the armature windings and the field excitation circuit because the mutual flux is confined to the excitation axis by the short circuited stator winding, the inductive reactance of the armature remains substantially constant under all conditions of excitation, speed and load. It may therefore be neutralized by a fixed value of capacitive reactance.

Series capacitive reactance may be inserted in the armature circuit by means of a resonator transformer 36 having a primary 37 positioned upon one leg 38 of a transformer core 39. The primary 37 of the resonator transformer 36 is connected in series with one of the armature circuit conductors, for example, conductor 34. The leg 38 of the core 39 also has a transformer secondary 41 positioned thereon and a capacitor 42 is connected across the transformer secondary 41. By employing an air gap 43 in the magnetic circuit of the transformer 36 to reduce saturation effects, a relatively small core 39 may be employed to provide a substantially constant capacitive reactance for any armature current drawn by the motor within its operating range. By employing a substantially greater number of turns in the secondary 41 than in the primary 37 of the transformer 36, so as to obtain a step-up transformer, a relatively small capacity high voltage capacitor 42 may be employed to resonate the armature circuit even though large currents flow in the armature circuit.

The circuit of Fig. 1 is arranged to drive the shunt motor from a single phase source of alternating current represented by the lines $L_1$ and $L_2$. Speed control and reversal of the motor may be obtained, for example, by employing an armature circuit auto-transformer 44 connected across the lines $L_1$ and $L_2$. The conductor 33 of one side of the armature may be connected to a center tap CT and the other side of the armature may be connected to an adjustable tap AT. Moving the adjustable tap from the position shown towards the center tap will lower the armature voltage and therefore the adjusted speed of the motor and carrying the adjustable tap past the CT will reverse the motor and increase its adjusted speed in the opposite direction. The field excitation may likewise be varied to vary the speed of the motor by employing a field circuit auto-transformer 46 provided with an adjustable tap 47. Since the motor circuit illustrated substantially eliminates reaction from currents flowing in the armature coils upon the excitation circuit, a fixed relationship between the voltage applied across the excitation winding 22 and the armature circuit applied voltage may be obtained by employing a small capacitor 48 in series in the field excitation circuit. Depending upon the speed range desired, either of the transformers 46 or 44 may be eliminated. By applying full field excitation to the motor and varying the armature voltage by means of the auto-transformer 44, the motor operates in a low speed range with constant torque characteristics for full load armature current, and by applying full armature voltage and varying the field excitation by means of the auto-transformer 46, the motor operates in a high speed range and has a constant horse-power characteristics for full load armature current.

The vector diagram of Fig. 2 illustrates the current voltage and flux relationships in the circuit. In the vector diagram of Fig. 2, $V_A$ is the armature circuit applied voltage. Since the armature circuit has inductive reactance, the actual voltage applied across the armature circuit exclusive of the resonator transformer 36 may be represented by the vector $V_{MA}$. The voltage across the resonator transformer is represented by the vector $V_{CA}$. Since the armature circuit is in series resonance the armature current $I_A$ is in phase with the armature circuit applied voltage $V_A$ and lags the voltage $V_{MA}$ across the remainder of the armature circuit. Since the source illustrated in Fig. 1 is a single phase source, the voltage $V_F$ applied across the excitation circuit is in phase with the voltage $V_A$ applied across the armature circuit. By inserting a capacitor 48 in series with the excitation circuit, the voltage $V_{MF}$ applied across the excitation windings 22 may be made to lead the field circuit applied voltage $V_F$ by a large angle such that the field current $I_F$ also leads the voltage $V_F$ applied across the excitation circuit, the voltage across the capacitor 48 being represented by the vector $V_{CF}$. The mutual flux $Q_M$ lags the field current $I_F$ and by employing a capacitor 48 of the correct capacity, the mutual flux $Q_M$ may be brought exactly into phase with the armature circuit applied voltage $V_A$ and the armature current $I_A$. This is only possible, however, if currents flowing in the armature circuit are prevented from reacting upon the field circuit to change its impedance, for example, by employing the short circuited stator winding and the commutator circuit shown or their equivalents.

The back voltage $E_A$ induced in the armature windings by movement of the conductors thereof through the mutual flux is in phase opposition to the armature circuit applied voltage $V_A$ and differs therefrom only by the resistance drop in the armature circuit since the armature circuit is in series resonance and has no resulting reactance drop. By thus eliminating reactance drops in the armature circuit, the armature current $I_A$ remains in phase with the armature circuit applied voltage, the field circuit applied voltage and the mutual flux under all conditions of speed and load. It would not, however, maintain this phase relationship under varying loads if there were a reactance drop in the armature circuit. Furthermore, it would not remain in phase with the mutual flux if there were any reaction of currents flowing in the armature upon the excitation circuit since the mutual flux $Q_M$ would then vary its phase with load.

The motor circuit shown in Fig. 3 operates in a manner very similar to that of Fig. 1. Where the elements of Fig. 3 are the same in structure and have the same function, they have been given the same reference numerals. Thus the rotor 11 of the motor of Fig. 3 is identical with the rotor 11 of the motor of Fig. 1 and employs the same type of brush structures 23 and 24. A different type of reactor core 51 is employed but the reactor coils 29a to 29f, inclusive, and 32a' to 32f', inclusive, occupy the same relative positions upon the core 51 of Fig. 3 as they do upon the core 31 of Fig. 1 and are connected to the brush elements in exactly the same manner. The major differences between the circuit of Fig. 1 and the circuit of Fig. 3 is that the circuit of Fig. 3 is arranged to be operated from a three-phase source of alternating current power, represented by the conductors $L_1$, $L_2$ and $L_3$ instead of from a single-phase source of power; the stator is provided with a winding 52 connected in series with the armature instead of the short circuited stator winding shown in Fig. 1, and the resonator transformer 36 of Fig. 1 has been combined with the reactor 26 of Fig. 1 to provide a combined reactor and resonator transformer 53 in Fig. 3.

The reactor core 51 of Fig. 3 has been provided with a seventh leg 54 upon which is positioned a secondary transformer winding 56 across which the capacitor 42 is connected. In the reactor structure 53 of Fig. 3, the reactor coils 29a to 29f and 32a' to 32f' also function as transformer primaries. That is to say, the magnetomotive forces due to flow of armature power currents through the various reactor coils add to cause a flux through the leg 54 of the reactor core 51. By placing a transformer secondary 56 upon this leg and connecting the capacitor 42 across the secondary, capacitive reactance is effectively inserted in the armature circuit without employing a separate resonator transformer structure. The capacitive reactance inserted in the armature circuit may be exactly balanced against the inductive reactance of the armature circuit to produce a condition of series resonance. As is the case with the resonator transformer 36 of Fig. 1, the leg 54 of the core 51 of Fig. 3, upon which the transformer secondary 56 is positioned, is preferably provided with an air gap 57 so as to enable the capacitive reactance inserted into the armature circuit to be maintained substantially constant for any armature current within the working range of the motor, even though the core 51 may be relatively small.

Although the short circuited stator winding illustrated in Fig. 1 for confining the mutual flux to the excitation axis is preferred, it is entirely possible to employ a winding 52 upon the stator which is connected in series with the armature for the same purpose. If the magnetomotive forces developed by the armature power current flowing through the winding 52 are the same as the magnetomotive forces developed by the armature power currents flowing through the armature windings 12 and 13 and are in phase opposition in the iron of the motor, no substantial amount of flux will exist in the power axis of the motor and all of the mutual flux will be confined to the excitation axis of the motor.

The three-phase source of power represented by the conductors $L_1$, $L_2$ and $L_3$ may be employed to establish a proper phase relationship between the excitation voltage applied across the excitation winding 22 and the voltage applied across the armature circuit in order to bring the mutual flux into phase with the latter voltage as well as into phase with the armature current. Thus an auto-transformer 58, connected across $L_2$ and $L_3$, may have a center tap CT connected to one side of the armature circuit and an adjustable tap AT connected to the other side of the armature circuit. Movement of the adjustable tap AT can be employed to adjust the speed of the motor as well as start, stop and reverse the motor. The field excitation circuit may be connected between a fixed tap FT on the auto-transformer 58 displaced a distance $x$ from the center tap CT and the line $L_1$. Thus an auto-transformer 59 is shown as being connected between the fixed tap FT and the line $L_1$. The auto-transformer 59 may be provided with a variable tap 61 in order to provide for varying the field excitation voltage, the excitation winding 22 being connected between one end of the auto-transformer 59 and the adjustable tap 61 thereon, although the transformer 59 may be eliminated, if it is not desired to vary the speed of the motor in the higher speed range.

Figure 4:
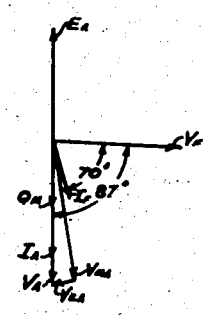
Fig. 4 is a vector diagram applicable to the circuit of Fig. 3.

The vector diagram of Fig. 4 is very similar to the vector diagram of Fig. 2 except that the voltage relationships of a three-phase source of power are employed to establish the desired fixed phase relationship between the field excitation voltage $V_F$ and the armature circuit applied voltage $V_A$ instead of employing the capacitor 48 of Fig. 1 for accomplishing the same purpose with a single phase source. Otherwise the vector diagram of Fig. 4 is exactly the same as the vector diagram of Fig. 2. Again, a condition of series resonance in the armature circuit enables the armature current to be maintained in phase with the mutual flux under all conditions of excitation, speed and load since reactance drops are cancelled from the armature circuit and reaction of any currents in the armature of the motor upon the field excitation circuit is prevented by the series stator winding 52 and the commutation circuit illustrated.

The motors of the present invention will produce regenerative braking to return power to the source if overdriven in any manner, for example, by an inertia load when the adjusted speed of the motor is abruptly lowered. The motors will therefore act as generators if they are connected to a power line or other frequency setting source and are driven at a speed at which the induced voltage in the armature winding is sufficient to cause current to flow against the voltage of the voltage source.

From the above description of the invention, it is apparent that I have provided an improved alternating current shunt motor in which the armature circuit may be maintained in a condition of series resonance so that the armature current may be maintained in phase with the mutual flux under all conditions of excitation, speed and load.

This application is a continuation-in-part of my copending application, Serial No. 696,006, filed September 10, 1946, now Patent No. 2,505,218 issued April 25, 1950.

I claim:

1. In a rotating dynamoelectric alternating current machine system including a machine of the shunt type having an armature, a commutator, an armature circuit and means to produce a mutual flux in the iron of said machine in phase with the armature circuit applied voltage, the combination with means for maintaining the armature current in phase with said mutual flux including a resonator transformer having a primary winding in series with said armature circuit and a secondary winding having a capacitor connected thereacross for inserting capacitive reactance into said armature circuit in an amount substantially equal to the inductive reactance of said circuit.

2. In a rotating dynamo-electric alternating current machine system including a machine of the shunt type having an armature, a commutator, an armature circuit and means to produce a mutual flux in the iron of said machine in phase with the armature circuit applied voltage, the combination with means for maintaining the armature current in phase with said mutual flux including a resonator transformer having a primary winding in series with said armature circuit and a secondary winding having a capacitor connected thereacross for inserting capacitive reactance into said armature circuit in an amount substantially equal to the inductive reactance of said circuit, said transformer being a step-up transformer and said capacitor having a greater capacitive reactance than the actual capacitive reactance inserted in said armature circuit.

3. In a rotating dynamo-electric alternating current machine system including a machine of the shunt type having an armature, a commutator, an armature circuit and means to produce a mutual flux in the iron of said machine in phase with the armature circuit applied voltage, the combination with means for maintaining the armature current in phase with said mutual flux including a resonator transformer having a primary winding in series with said armature circuit and a secondary winding having a capacitor connected thereacross for inserting capacitive reactance into said armature circuit in an amount substantially equal to the inductive reactance of said circuit, said transformer having an iron core provided with an air gap in the magnetic circuit.

4. A combined reactor and resonator transformer structure for substantially preventing flow of circulating current in a plurality of parallel circuits forming a part of an armature circuit for an alternating current dynamo-electric machine while inserting series capacitive reactance in said armature circuit, said structure having a core provided with a plurality of reactor legs and a transformer leg, a plurality of reactor coils on said reactor legs, one of said reactor coils being in series in each of said parallel circuits and said reactor coils being connected to produce a resultant magnetomotive force due to flow of said circulating currents causing a flux in said reactor legs and being connected to produce a magnetomotive force due to flow of armature power current causing a flux in said transformer leg, a transformer secondary winding positioned upon said transformer leg, and a capacitor connected across said winding to insert series capacitive reactance into said armature circuit.

5. A combined reactor and resonator transformer structure for substantially preventing flow of circulating current in a plurality of parallel circuits connected to individual brush elements of divided brush structures forming a part of an armature circuit for an alternating current dynamo-electric machine while inserting series capacitive reactance in said armature circuit, said structure having a core provided with a plurality of reactor legs and a transformer leg, a plurality of reactor coils on said reactor legs, one of said reactor coils being in series in each of said parallel circuits and said reactor coils being connected to produce a resultant magnetomotive force due to flow of said circulating currents causing a flux in said reactor legs and being connected to produce a magnetomotive force due to flow of armature power current causing a flux in said transformer leg, a transformer secondary winding positioned upon said transformer leg, and a capacitor connected across said winding to insert series capacitive reactance into said armature circuit.

6. A combined reactor and resonator transformer structure for substantially preventing flow of circulating current in a plurality of parallel circuits connected to individual brush elements of divided brush structures forming a part of an armature circuit for an alternating current dynamo-electric machine while inserting series capacitive reactance in said armature circuit, said structure having a core provided with a plurality of reactor legs and a transformer leg, a plurality of reactor coils on said reactor legs, one of said reactor coils being in series in each of said parallel circuits and said reactor coils being connected to produce a resultant magnetomotive force due to flow of said circulating currents causing a flux in said reactor legs and being connected to produce a magnetomotive force due to flow of armature power current causing a flux in said transformer leg, a transformer secondary winding positioned upon said transformer leg, and a capacitor connected across said winding to insert series capacitive reactance into said armature circuit, said transformer leg of said core having an air gap therein.

LELAND CLAY WEATHERS.

REFERENCES CITED

The following references are of record in the file of this patent:

UNITED STATES PATENTS

| Number | Name | Date |
|---|---|---|
| 602,920 | Steinmetz | Apr. 26, 1898 |
| 1,676,312 | Alexanderson | July 10, 1928 |
| 1,845,173 | Nyman | Feb. 16, 1932 |